US008140962B2

(12) United States Patent  (10) Patent No.: US 8,140,962 B2
Bertram et al.  (45) Date of Patent: Mar. 20, 2012

(54) DYNAMICALLY SELECTING PROPERTIES TO DISPLAY IN A TABLE BASED USER INTERFACE

(75) Inventors: Randal L. Bertram, Raleigh, NC (US); Steven G. Halverson, Rochester, MN (US); Kerry A. Ortega, Raleigh, NC (US); Andrew J. Streit, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 12/100,438

(22) Filed: Apr. 10, 2008

(65) Prior Publication Data

US 2009/0259930 A1   Oct. 15, 2009

(51) Int. Cl.
*G06F 17/00* (2006.01)
(52) U.S. Cl. ......... 715/227; 715/243; 715/246; 715/273
(58) Field of Classification Search .................. 715/227, 715/231, 243, 273, 246
See application file for complete search history.

(56) References Cited

U.S. PATENT DOCUMENTS

| | | | |
|---|---|---|---|
| 5,818,446 A | 10/1998 | Bertram et al. | |
| 6,115,759 A | 9/2000 | Sugimura et al. | |
| 6,613,099 B2 * | 9/2003 | Crim | 715/210 |
| 7,171,424 B2 | 1/2007 | Barsness et al. | |
| 7,197,706 B1 * | 3/2007 | Berson et al. | 715/234 |
| 7,360,168 B2 * | 4/2008 | Bertram et al. | 715/777 |
| 7,873,912 B1 * | 1/2011 | Crim et al. | 715/765 |
| 7,917,864 B2 * | 3/2011 | Bertram et al. | 715/777 |
| 7,934,151 B1 * | 4/2011 | Castrucci et al. | 715/222 |
| 2003/0163490 A1 | 8/2003 | Kitamura | |

OTHER PUBLICATIONS

Marchionini et al., "Extending Understanding of Federal Statistics in Tables", Submitted to: Universal Usability Special Edition of "Interacting with Computers", Citeseer: 2000, 6 pages.

* cited by examiner

*Primary Examiner* — Stephen Hong
*Assistant Examiner* — Matthew Ludwig
(74) *Attorney, Agent, or Firm* — Francis Lammes; Stephen J. Walder, Jr.; Matthew C. Zehrer (57) ABSTRACT

Dynamically selecting which properties to display for a group of resources is provided. A selection of a group of resources is received to be viewed in a graphical user interface. A determination is made as to whether the group of resources is one of a plurality of previously saved groups of resources. Responsive to the group of resources being one of the plurality of previously saved groups of resources, a determination is made as to whether the previously saved group of resources has an associated saved group of properties. Responsive to the previously saved group of resources having the associated saved group of properties, a table is generated that comprises the previously saved group of resources and the associated saved group of properties. The table is then displayed to a user via a graphical user interface.

24 Claims, 6 Drawing Sheets

PROPERTY PREFERENCES 400

| PREFERENCE ID 402 | RESOURCES BEING VIEWED 404 | PROPERTY TO BE PRESENTED 406 |
|---|---|---|
| USER | A* AND B* AND C* | 1, 2, 3 |
| USER | C* AND F* OR G* | 3 |
| ⋮ | ⋮ | ⋮ |
| GROUP | A* AND B* | 2, 3 |
| GROUP | B* AND F* AND G* | 1, 4 |
| ⋮ | ⋮ | ⋮ |
| TYPE/CLASS | A | 1, 2 |
| TYPE/CLASS | B | 1, 2, 3, 6 |
| TYPE/CLASS | C | 1, 2, 4 |
| TYPE/CLASS | D | 1, 2, 5, 7 |
| TYPE/CLASS | E | 1, 2, 4, 5 |
| TYPE/CLASS | F | 1, 2, 3, 4, 6 |
| TYPE/CLASS | G | 1, 2, 4, 7 |
| TYPE/CLASS | H | 1, 2, 3, 4, 8 |
| ⋮ | ⋮ | ⋮ |

408 brackets the two USER rows; 410 brackets the TYPE/CLASS rows.

DYNAMICALLY SELECTING PROPERTIES TO DISPLAY IN A TABLE BASED USER INTERFACE

BACKGROUND OF THE INVENTION

1. Field of the Invention

The present application relates generally to an improved data processing apparatus and method and more specifically to an apparatus and method for dynamically selecting properties to display in a table based user interface.

2. Background of the Invention

Many applications provide user interfaces that present data to a user in a table format. These tables generally consist of resources in rows in the table and properties of those resources in columns of the table. The applications normally provide a default set of property columns that are presented to the user. However, the applications also generally provide a mechanism that allows the user to set user preferred property columns, thereby overriding the default property column presentation. Nonetheless, the applications usually provide useful information to the user in the default property columns such that the user does not normally need to override the default settings.

Most applications provide the same default property columns no matter what type of resources are being viewed in the table. For instance, Microsoft® Windows® Explorer defaults the property information to include Name, Size, Type, and Date Modified. While in most applications the user can change the presented properties for a particular folder or for all folders, the applications do not change the property for a folder automatically and dynamically based on what resources are presented.

BRIEF SUMMARY OF THE INVENTION

In one illustrative embodiment, a method, in a data processing system, is provided for dynamically selecting which properties to display for a group of resources. The illustrative embodiments receive a selection of a group of resources to be viewed in a graphical user interface. The illustrative embodiments determine if the group of resources is one of a plurality of previously saved groups of resources. Responsive to the group of resources being one of the plurality of previously saved groups of resources, the illustrative embodiments determine if the one previously saved group of resources has an associated saved group of properties. Responsive to the previously saved group of resources having the associated saved group of properties, the illustrative embodiments generate a table that comprises the previously saved group of resources and the associated saved group of properties. The illustrative embodiments then display the table to a user via a graphical user interface.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE INVENTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
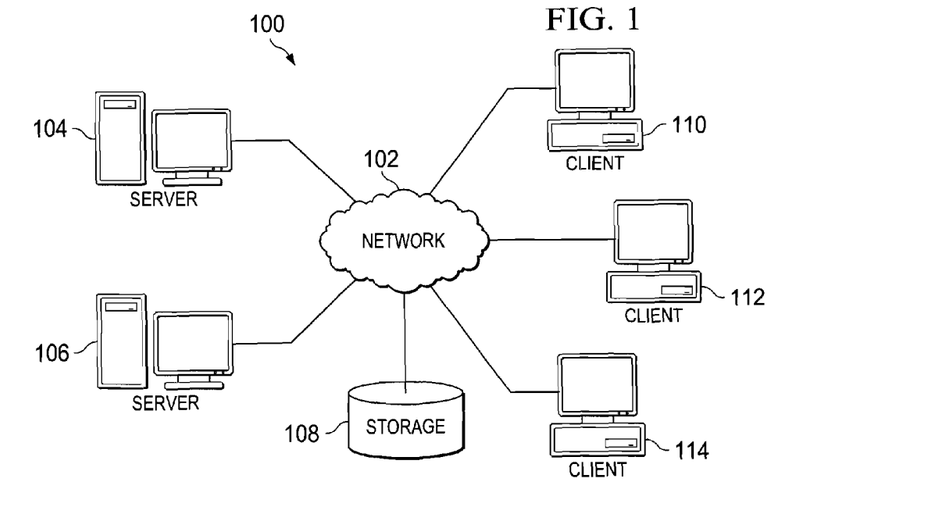
FIG. 1 depicts a pictorial representation of an exemplary distributed data processing system in which aspects of the illustrative embodiments may be implemented.
Figure 2:
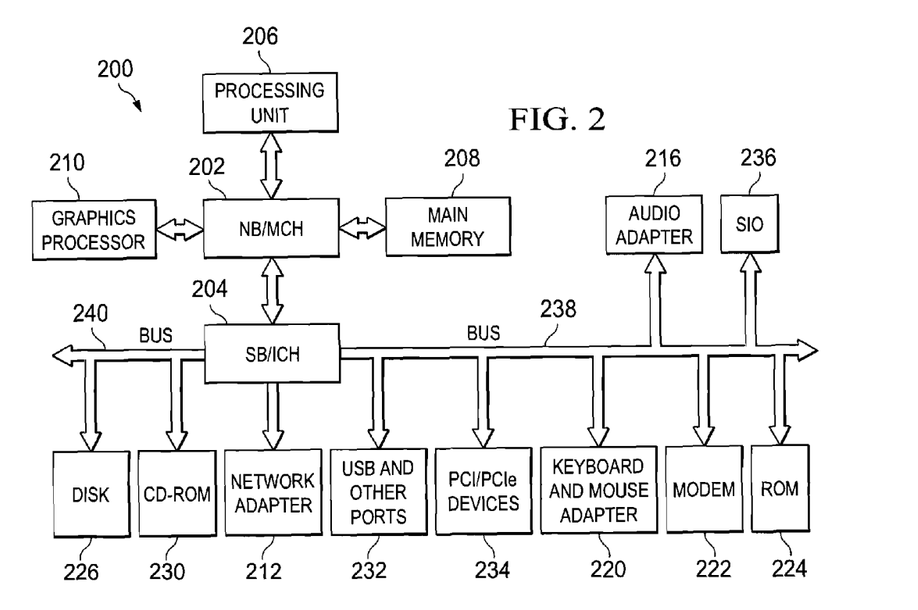
FIG. 2 depicts a block diagram of an exemplary data processing system in which aspects of the illustrative embodiments may be implemented.

The illustrative embodiments provide a mechanism for dynamically selecting which properties to display in a table based user interface. Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as exemplary environments in which exemplary aspects of the illustrative embodiments may be implemented. While the description following FIGS. 1 and 2 will focus primarily on a single data processing device implementation of a mechanism that dynamically selects which properties to display in a table based user interface, this is only exemplary and is not intended to state or imply any limitation with regard to the features of the present invention. To the contrary, the illustrative embodiments are intended to include distributed data processing environments and embodiments in which properties that are to be displayed in a table based user interface are dynamically selected based on the resources and resource types that are being displayed.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 10, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

In general, a file system provides for storing and organizing computer files and/or resources and data associated with those resources so that the resources may be found and accessed easily. Such file systems allow a user to view and navigate resources of many types. These resources may be organized in groups of resources and the types of resources in each group may be very diverse. That is, each resource may have different properties. The illustrative embodiments provide a mechanism for dynamically selecting which properties are displayed to the user based on the resource types currently being displayed to the user.

Figure 3:
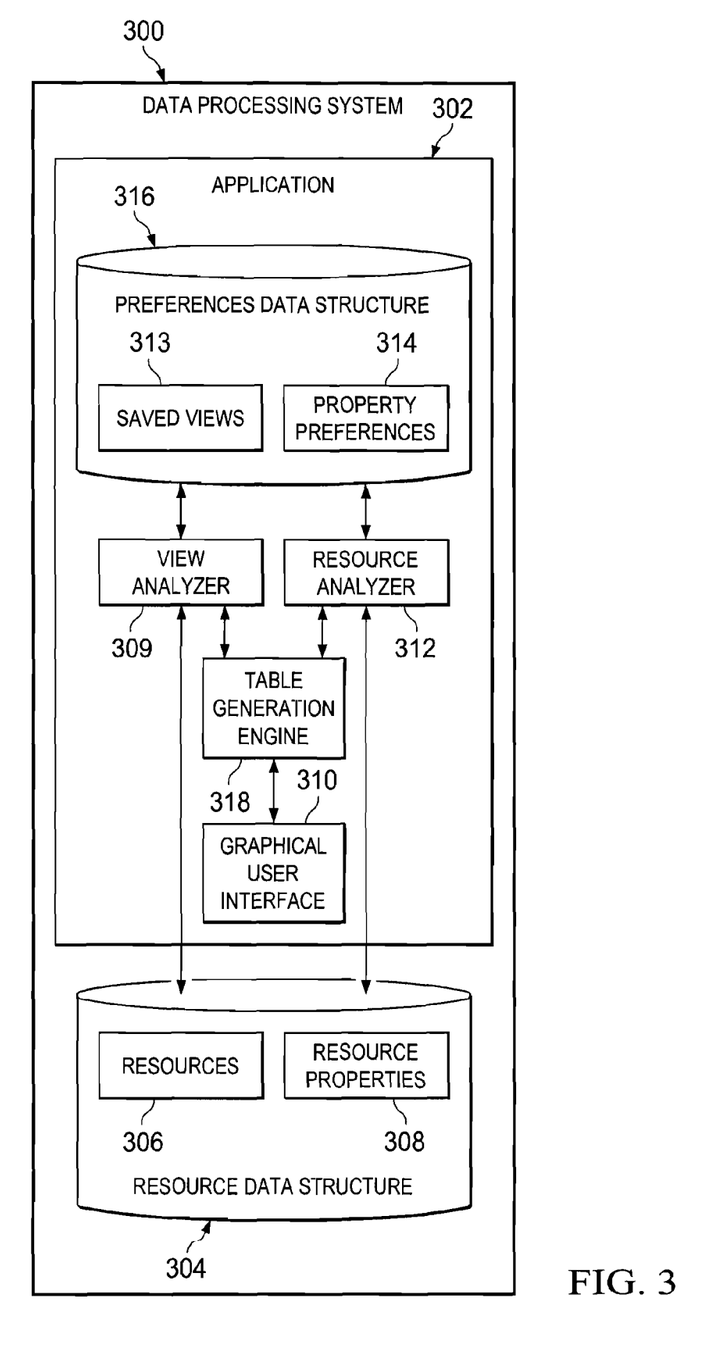
FIG. 3 depicts a data processing system in which properties are dynamically selected and displayed in a table based user interface based on the resources and resource types that are being displayed in accordance with an illustrative embodiment.

FIG. 3 depicts a data processing system in which properties are dynamically selected and displayed in a table-based user interface in accordance with an illustrative embodiment. Data processing system 300 may comprise application 302 and one or more of resource data structures 304. Resource data structure 304 may be a data storage device, such as a hard disk, CD-ROM, or the like, which maintains an identification of resources 306 and associated resource properties 308 that are associated with data processing system 300. Resource data structure 304 may be locally associated with data processing system 300 or access by data processing system 300 via a network, such as network 102 of FIG. 1.

Application 302 provides graphical user interface 310 through which resources 306 and associated resource properties 308 are displayed to a user. However, resources 306 may be comprised of may different types of resources, such as hardware, applications, files or the like. Furthermore, each of the larger categories of resources may comprise smaller categories. For example, hardware resources may be comprised of servers, switches, blades, chassis, and the like. While files may be comprised of text documents, spreadsheet documents, presentation documents, email documents, and the like. Thus, for resources 306 which are associated with data processing system 300, the illustrative embodiments provide for dynamically selecting which properties to display to a user.

In order to display only the resource properties which are most important to all of the resource types which the user has selected to view, application 302 first employs a view analyzer 309 to determine if the user has selected a view of a select group of resources that has been saved by the user in saved views 313. If view analyzer 309 determines the selected view to be a view in saved views 313, then view analyzer 309 determines if the saved view has an associated selection of properties. If view analyzer 309 determines the selected saved view has a selected group of properties, then table generation engine 318 generates a table of the selected groups of resources and the property columns associated with the selected group of properties, and the table is then displayed to the user using graphical user interface 310.

Figure 4:
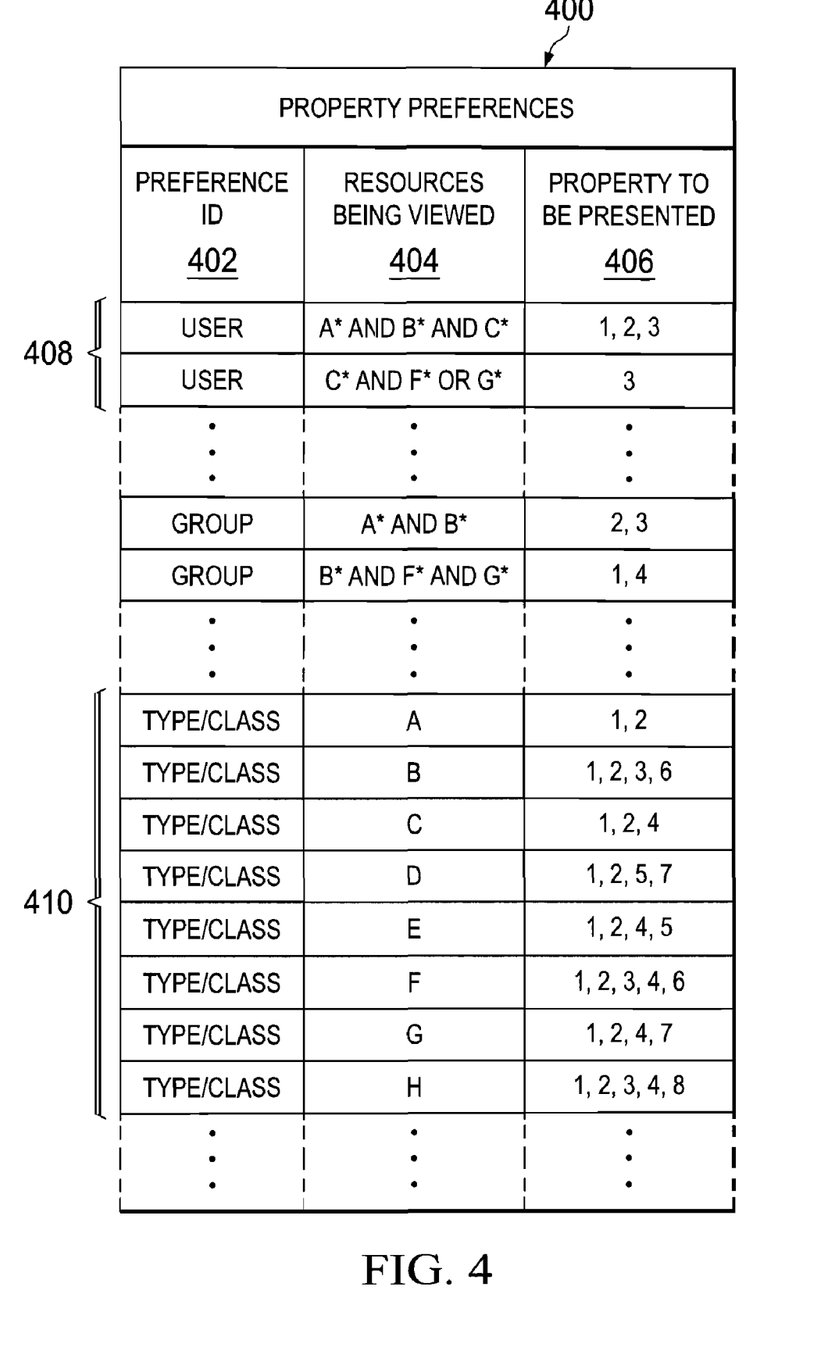
FIG. 4 depicts an exemplary listing of property preferences in accordance with an illustrative embodiment.

However, if the selected saved view fails to have a selected group of properties or if the selected view is not a saved view, application 302 employs resource analyzer 312. When a user selects a group of resources 306 to view, resource analyzer 312 analyzes the selected group of resources 306 to determine which of associated resource properties 308 are to be displayed to the user based on the types of resources that comprise the selected group of resources 306. To do this analysis, resource analyzer 312 identifies all of the types of resources in the selected group of resources 306. Then, based on the identified types of resources, resource analyzer 312 determines if the user has stored a preference associated with the identified types of resources. Resource analyzer 312 analyzes a list of property preferences 314, which is depicted in FIG. 4, stored in preferences data structure 316 to determine which property columns(s) to display based on the identified types of resources being viewed. For example, if the selected group of resources 306 are of types A, B and C, where each of which may have ten properties and where only three are common between the types, then the user may have set a user preference to view only the three common properties. Using the preferences identified in property preferences 314, table generation engine 318 generates a table of the selected groups of resources 306 which includes property columns 1, 2, and 3 and displays the table to the user using graphical user interface 310.

However, if the user has not specified a user preference for the types of resources being viewed, resource analyzer 312 determines if a group preference is identified in property preferences 314 associated with the selected group of resources 306. A group preference may be a preference of properties that is set by an administrator of the application. If there is an identified group preference, table generation engine 318 generates a table of the selected groups of resources 306 which includes property columns associated with the group preference. If there is not a group preference, then resource analyzer 312 determines if there is an identifier with the selected groups of resources indicating that the selected group of resources 306 are of a common resource type. If there is an explicit identification of the resource types, then resource analyzer 312 determines if there is a resource type preference in property preferences 314 associated with specified type of resources in the selected group of resources 306. If resource analyzer 312 identifies a specified resource type preference in property preferences 314, then table generation engine 318 generates a table of the selected groups of resources 306 which includes property columns associated with the specified resource type preference.

If there is not an explicit identification of the resource types, then resource analyzer 312 determines if the resource types in the selected group of resources 306 are common. For example, resource analyzer 312 determines if all of the resource types are of type A. If resource analyzer 312 identifies a commonality between the resource types in the selected group of resource 306 and an associated resource type preference in property preference 314, then table generation engine 318 generates a table of the selected groups of resources 306 which includes property columns associated with the resource type preference. If there is no commonality between the resource types on the selected group of resources 306, then resource analyzer 312 performs one final analysis to determine if there is a common base class associated with the resource types in the selected group of resources 306, which is described in further detail in FIG. 5.

If resource analyzer 312 determines that there is a common base class associated with the resource types in the selected group of resources 306, then resource analyzer 312 determines if there is a base class preference identified in property preferences 314 associated with the identified base class. If there is an identified base class preference, table generation engine 318 generates a table of the selected groups of resources 306 which includes property columns associated with the base class preference. If in the event resource analyzer 312 fails to identify a common base class, then table generation engine 318 generates a table of the selected groups of resources 306 using a default property selection.

Thus, a resource analyzer dynamically selects which properties are to be displayed to a user. The resource analyzer determines the property preferences based on a hierarchy of user preferences, group preferences, specified resource type preferences, common resource type preferences, and base class preferences. Once an identification of a preference is determined, a table generation engine generates a table with only the preferred properties which is presented to the user through a graphical user interface.

FIG. 4 depicts an exemplary listing of property preferences in accordance with an illustrative embodiment. Property preference table 400 may be comprised of preference identifier 402, resources being viewed 404, and properties to be presented 406. Once a resource analyzer has identified resource types associated with a group of resources to be viewed, the resource analyzer accesses property preference table 400 to determine if there is a preference listed in the table that identifies which properties are to be displayed. Based on the level of identification the resource analyzer is performing, the resource analyzer identifies preferences in preference id 402 based on user preferences, then group preferences, then type preferences, and then base class preferences. In operation, the resource analyzer determines if there is grouping of resource types in resources being viewed 404 that matches the resource types of the resources selected by the user.

For example, if the resource analyzer is looking for a user preference that contains resource types A, B, and C, then the resource analyzer may identify user preference 408 and reference properties to be presented 406 to see that only properties 1, 2, and 3 should be presented with the selected group of resources. As another example, if resource analyzer is looking for a type preference that contains resource types G, then the resource analyzer may identify type preference 410 and reference properties to be presented 406 to see that only properties 1, 2, 4, and 7 should be presented with the selected group of resources. While property preference table 400 indicates user, group, type, and class preferences, one of ordinary skill in the art would realize that any type of preference may be presented.

Thus, a property preference table may be used by a resource analyzer to identify which properties to present to a user based on the resource types of the resources selected by the user. Using this type of preference identification provides for presenting only pertinent information to a user without the user having to customize each view.

Figure 5:
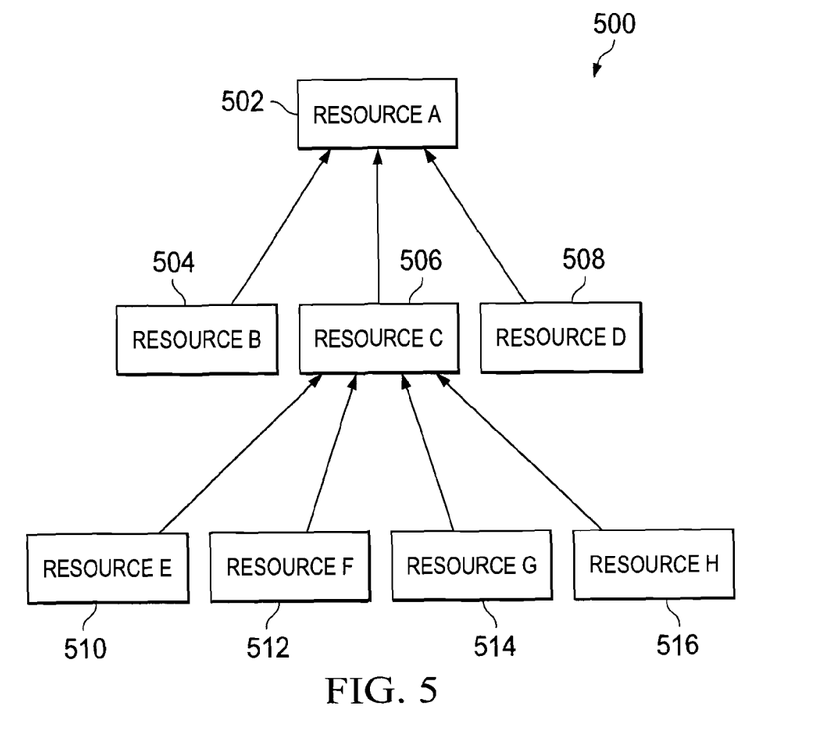
FIG. 5 illustrates the determination of a base class in accordance with an illustrative embodiment.

FIG. 5 illustrates the determination of a base class in accordance with an illustrative embodiment. In class hierarchy 500, resource may be grouped into classes, such that resource A 502 may have subclasses of resource B 504, resource C 506, and resource D 508. Furthermore each subclass may have further subclasses, such as resource C 506 may have subclasses of resource E 510, resource F 512, resource G 514, and resource H 516. A resource analyzer, such as resource analyzer 312 in FIG. 3, may use class hierarchy 500 to determine if resources within a selected group of resources fall within a common base class. For example, if a selected group of resources comprises resource E 510, resource F 512, and resource H 516, then the resource analyzer may determine which properties to display with the selected group of resources using the type identifier associated with resource C 506, since resource E 510, resource F 512, and resource H 516 are subclasses of base class resource C 506. As another example, if a selected group of resources comprises resource E 510, resource G 514, and resource D 508, then the resource analyzer may determine which properties to display with the selected group of resources using the type identifier associated with resource A 502, since resource E 510, resource G 514, and resource D 508 are subclasses of base class resource A 502.

Using a class hierarchy, such as class hierarchy 500, may provide for a clearer presentation of the properties associated with resource types when resources types of classes are being viewed together. Again, using this type of preference identification provides for presenting only pertinent information to a user without the user having to customize each view.

Figure 6A:
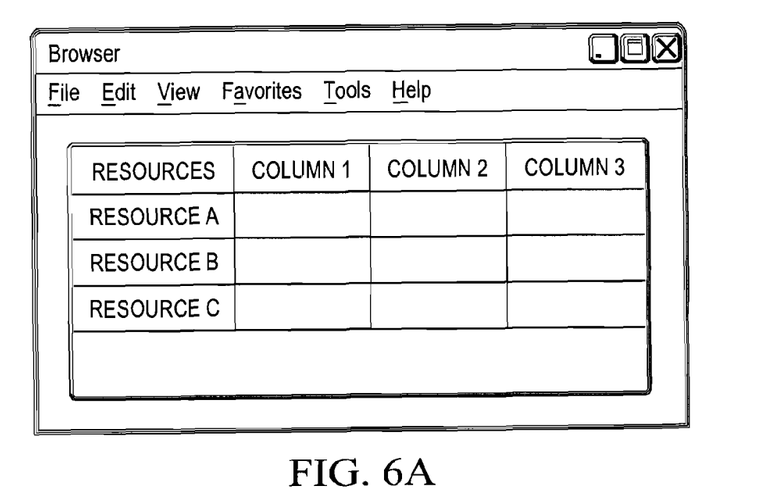
FIGS. 6A, 6B, and 6C illustrate exemplary tables of resources that may be displayed through dynamically selecting which properties to display based on the resource types of a selected group of resources in accordance with the illustrative embodiment.
Figure 6B:
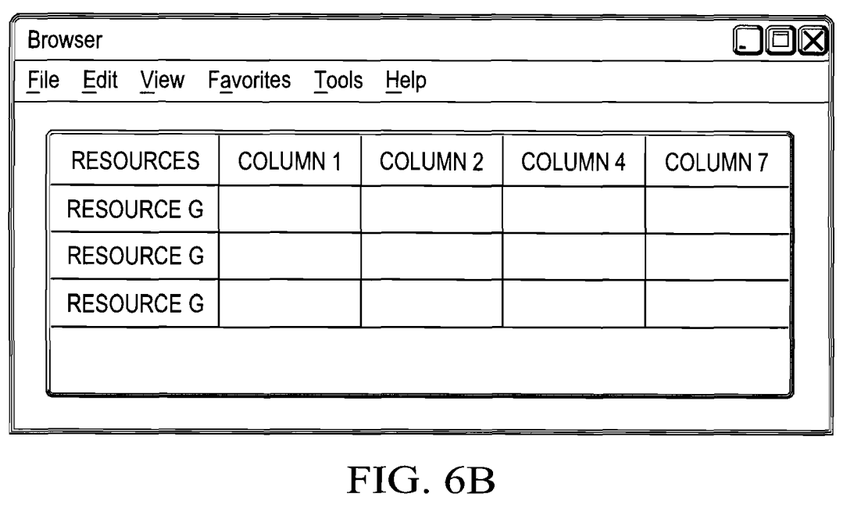
Figure 6C:
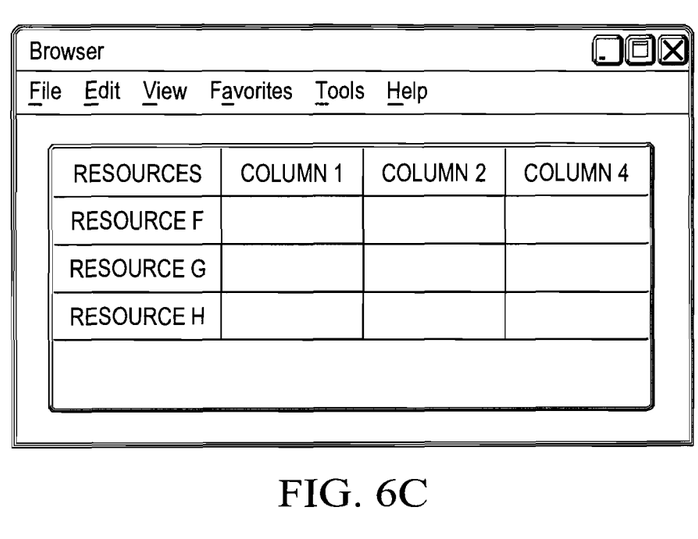

FIGS. 6A, 6B, and 6C illustrate exemplary tables of resources that may be displayed through dynamically selecting which properties to display based on the resource types of a selected group of resources in accordance with the illustrative embodiment. Using a property preference table, such as property preference table 400 in FIG. 4, FIG. 6A depicts a selected group of resources that include resource types A, B, and C. A resource analyzer, such as resource analyzer 312 of FIG. 3, analyzes the property preference table to determine if there is a preference for a group of resources that includes resource types of A, B, and C. In accordance with an exemplary embodiment, the resource analyzer may identify a user preference that indicates that properties to be displayed with such a group to include properties 1, 2, and 3. Thus, FIG. 6A illustrates a table that would be generated and displayed in a graphical user interface that would include property columns 1, 2, and 3 being displayed for a selected group of resources that includes resource types A, B, and C.

FIG. 6B depicts a selected group of resources that include resources all of type G. The resource analyzer may again analyze the property preference table to determine if there is a preference for a group of resources that includes resource types of G. In accordance with another exemplary embodiment, the resource analyzer may identify a type preference that indicates that properties to be displayed with such a group to include properties 1, 2, 4, and 7. Thus, FIG. 6B illustrates a table that would be generated and displayed in a graphical user interface that would include property columns 1, 2, 4, and 7 being displayed for a selected group of resources that includes resource type G.

FIG. 6C depicts a selected group of resources that include resource types F, G, and H. The resource analyzer may again analyze the property preference table to determine if there is a preference for a group of resources that includes resource types of F, G, and H. In this instance, since there is no defined group that contains resource types F, G, and H, the resource analyzer may determine if resource types F, G, and H belong to a base class using a class hierarchy, such as class hierarchy 500 in FIG. 5. In this instance, resource types F, G, and H, all belong to a base class of resource C. Therefore, in accordance with this exemplary embodiment, the resource analyzer may identify a class preference that indicates that properties to be displayed with such a group to include properties 1, 2, and 4. Thus, FIG. 6C illustrates a table that would be generated and displayed in a graphical user interface that would include property columns 1, 2, and 4 being displayed for a selected group of resources that includes resource types F, G, and H in the base class of resource C.

Figure 7:
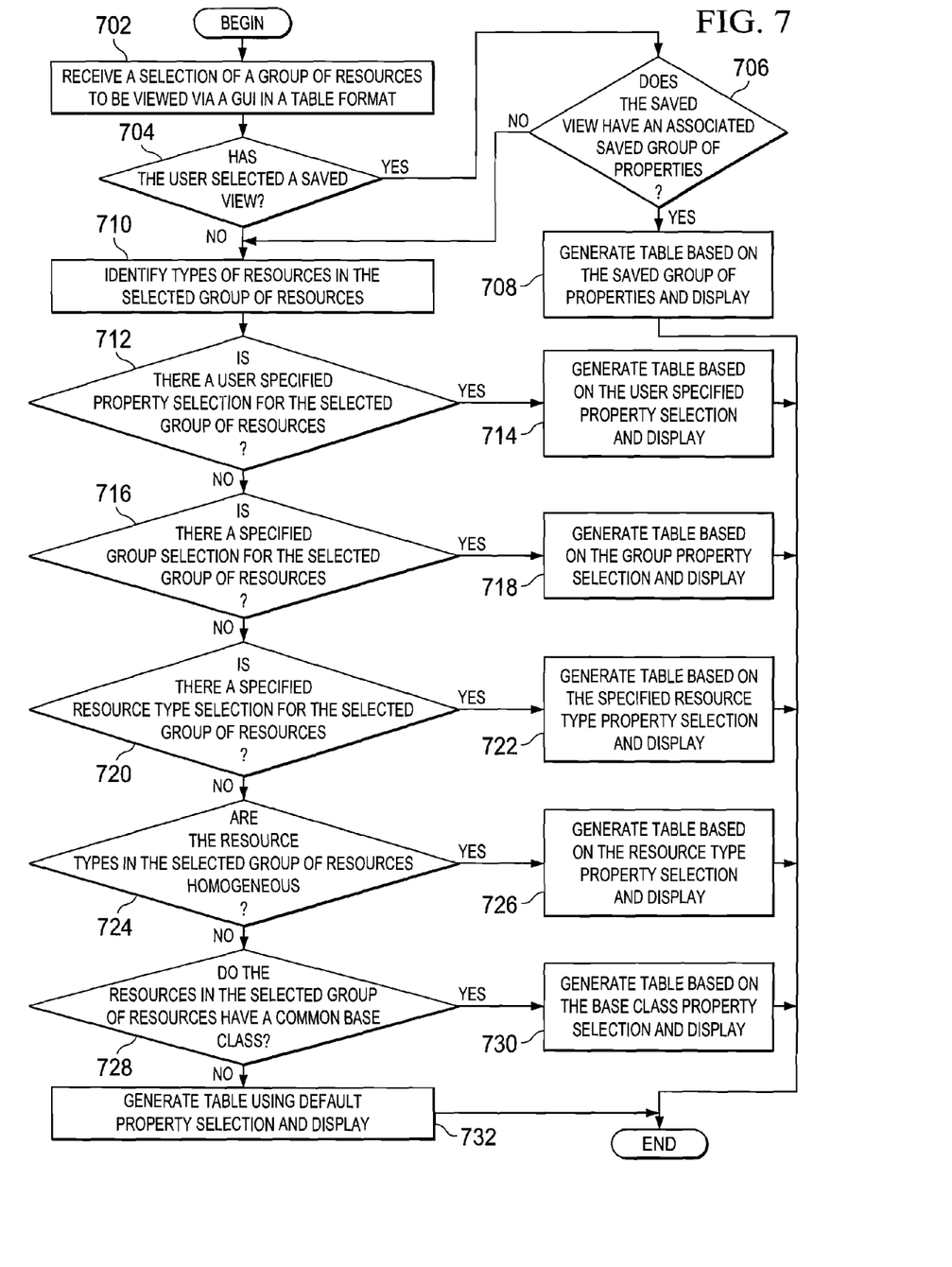
FIG. 7 illustrates the operation performed in dynamically selecting which properties to display to a user based on the resource types in a user selected group of resources in accordance with the illustrative embodiment.

FIG. 7 illustrates the operation performed in dynamically selecting which properties to display to a user in accordance with the illustrative embodiment. As the operation begins, an application receives a selection of a group of resources to be viewed in a table format via a graphical user interface (step 702). A view analyzer within the application determines if the user has selected a view of a select group of resources that has been saved by the user (step 704). If at step 704 the view analyzer determines the selected view to be a saved view, then the view analyzer determines if the saved view has an associated saved group of properties (step 706). If a step 706 the view analyzer determines the selected saved view has an associated saved group of properties, then the table generation engine generates a table of the selected groups of resources and the property columns associated with the saved group of properties and the table is displayed in a graphical user interface (step 708), with the operation ending thereafter.

However, if at step 704 the selected view is not a saved view or at step 706 the selected saved view fails to have a saved group of properties, then a resource analyzer within the application analyzes the selected group of resources to identify all of the types of resources within the selected group of resources (step 710). Then, based on the identified types of resources, the resource analyzer analyzes a listing of property preferences to determine if the user has stored a preference associated with the identified resource types (step 712). If at step 712 there is a user preference for the identified resource types, then a table generation engine generates a table of the selected groups of resources which includes the property columns that are identified with the user preference in the property preferences, which is displayed in a graphical user interface (step 714), with the operation ending thereafter.

If at step 712 the user has not specified a user preference for the identified resource types, the resource analyzer determines if a group preference is identified in the listing of property preferences for the identified resource types (step 716). If at step 716 there is a group preference for the identified resource types, then the table generation engine generates a table of the selected groups of resources which includes the property columns that are identified with the user preference in the property preferences, which is displayed in a graphical user interface (step 718), with the operation ending thereafter.

If at step 716 there is not a group preference, then the resource analyzer determines if there is an identifier with the selected groups of resources indicating that the selected group of resources are of a specified resource type (step 720). If at step 720 there is an indication of a specified resource type and the resource analyzer identifies a type preference associated with the specified resource type in the property preferences, the table generation engine generates a table of the selected groups of resources which includes the property columns that are identified in the user preference in the property preferences, which is displayed in a graphical user interface (step 722), with the operation ending thereafter.

If at step 720 there is not an explicit identification of the resource types, then the resource analyzer determines if the resource types in the selected group of resources are common (step 724). If at step 724 the resource analyzer identifies a commonality between the resource types in the selected group of resource and an associated resource type preference in the listing of property preferences, then the table generation engine generates a table of the selected groups of resources which includes property columns associated with the resource type preference, which is displayed in a graphical user interface (step 726), with the operation ending thereafter.

If at step 724 there is no commonality between the resource types on the selected group of resources, then the resource analyzer determines if there is a common base class associated with the resource types in the selected group of resources (step 728). If at step 728 the resource analyzer determines that there is a common base class associated with the resource types in the selected group of resources and the resource analyzer determines if there is a base class preference identified in the listing of property preferences, the table generation engine generates a table of the selected groups of resources which includes property columns associated with the base class preference, which is displayed in a graphical user interface (step 730), with the operation ending thereafter. If at step 728 the resource analyzer fails to identify a common base class, then the table generation engine generates a table of the selected groups of resources using a default property selection (step 732), with the operation ending thereafter.

Thus, the illustrative embodiments provide mechanisms for dynamically selecting which properties are displayed. The dynamic selection may be based on saved views or based on the resource types in a selected group of resources and preferences that are associated with those resource types. A resource analyzer determines the preference based on a hierarchy of user preferences, group preferences, specified resource type preferences, common resource type preferences, and base class preferences. Once an identification of a preference is determined, a table generation engine generates a table with only the preferred properties which is presented to the user though a graphical user interface.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer recordable medium having a computer readable program recorded thereon, wherein the computer readable program, when executed on a computing device, causes the computing device to:

receive a selection of a group of resources to be viewed in a graphical user interface;

determine whether the group of resources is one of a plurality of previously saved groups of resources;

responsive to the group of resources failing to be one of the plurality of previously saved groups of resources, identify one or more resource types within the group of resources;

determine whether a user specified property selection exists for the identified one or more resource types;

responsive to the absence of the user specified property selection, determine whether a group property selection exists for the identified one or more resource types;

responsive to the absence of the group property selection, determine whether a specified resource type property selection exists for the identified one or more resource types;

responsive to the existence of the specified resource type property selection, generate the table that, comprises the group of resources and the specified resource type property selection; and display the table to a user via a graphical user interface.

2. The computer program product of claim 1, wherein the computer readable program further causes the computing device to:

responsive to the previously saved group of resources failing to have the associated saved group of properties, identify one or more resource types within the group of resources;

determine whether a user specified property selection exists for the identified one or more resource types;

responsive to the existence of the user specified property selection, generate the table that comprises the group of resources and the user specified property selection; and display the table to the user via the graphical user interface.

3. The computer program product of claim 1, wherein the computer readable program further causes the computing device to:

responsive to the existence of the user specified property selection, generate the table that comprises the group of resources and the user specified property selection; and display the table to the user via the graphical user interface.

4. The computer program product of claim 3, wherein the computer readable program further causes the computing device to:

responsive to the existence of the group property selection, generate the table that comprises the group of resources and the group property selection; and display the table to the user via the graphical user interface.

5. The computer program product of claim 1, wherein the computer readable program further causes the computing device to:

responsive to the absence of the specified resource type property selection, determine whether the identified one or more resource types is homogeneous;

responsive to the identified one or more resource types being homogeneous, determine whether a resource type property selection exists for the identified one or more resource types;

responsive to the existence of the resource type property selection, generate the table that comprises the group of resources and the resource type property selection; and display the table to the user via the graphical user interface.

6. The computer program product of claim 5, wherein the computer readable program further causes the computing device to:

responsive to the absence of the resource type property selection, determine whether the identified one or more resource types has a common base class;

responsive to the identified one or more resource types having the common base class, determine whether a base class property selection exists for the identified one or more resource types;

responsive to the existence of the base class property selection, generate the table that comprises the group of resources and the base class property selection; and display the table to the user via the graphical user interface.

7. The computer program product of claim 6, wherein the computer readable program further causes the computing device to:

responsive to the absence of the base class property selection, generate the table that comprises the group of resources and a default property selection; and display the table to the user via the graphical user interface.

8. The computer program product of claim 1, wherein the computer readable program further causes the computing device to:

responsive to the group of resources being one of the plurality of previously saved groups of resources, determine whether the previously saved group of resources has an associated saved group of properties;

responsive to the previously saved group of resources having the associated saved group of properties, generate a table that comprises the previously saved group of resources and the associated saved group of properties; and display the table to the user via the graphical user interface.

9. An apparatus, comprising:

a processor; and a memory coupled to the processor, wherein the memory comprises instructions which, when executed by the processor, cause the processor to:

receive a selection of a group of resources to be viewed in a graphical user interface;

determine whether the group of resources is one of a plurality of previously saved groups of resources;

responsive to the group of resources failing to be one of the plurality of previously saved groups of resources, identify one or more resource types within the group of resources;

determine whether a user specified property selection exists for the identified one or more resource types;

responsive to the absence of the user specified property selection, determine whether a group property selection exists for the identified one or more resource types;

responsive to the absence of the group property selection, determine whether a specified resource type property selection exists for the identified one or more resource types;

responsive to the existence of the specified resource type property selection, generate the table that comprises the group of resources and the specified resource type property selection; and display the table to a user via a graphical user interface.

10. The apparatus of claim 9, wherein the instructions further cause the processor to:

responsive to the previously saved group of resources failing to have the associated saved group of properties, identify one or more resource types within the group of resources;

determine whether a user specified property selection exists for the identified one or more resource types;

responsive to the existence of the user specified property selection, generate the table that comprises the group of resources and the user specified property selection; and display the table to the user via the graphical user interface.

11. The apparatus of claim 9, wherein the instructions further cause the processor to:

responsive to the existence of the user specified property selection, generate the table that comprises the group of resources and the user specified property selection; and display the table to the user via the graphical user interface.

12. The apparatus of claim 11, wherein the instructions further cause the processor to:

responsive to the existence of the group property selection, generate the table that comprises the group of resources and the group property selection; and display the table to the user via the graphical user interface.

13. The apparatus of claim 9, wherein the instructions further cause the processor to:

responsive to the absence of the specified resource type property selection, determine whether the identified one or more resource types is homogeneous;

responsive to the identified one or more resource types being homogeneous, determine whether a resource type property selection exists for the identified one or more resource types;

responsive to the existence of the resource type property selection, generate the table that comprises the group of resources and the resource type property selection; and display the table to the user via the graphical user interface.

14. The apparatus of claim 13, wherein the instructions further cause the processor to:

responsive to the absence of the resource type property selection, determine whether the identified one or more resource types has a common base class;

responsive to the identified one or more resource types having the common base class, determine whether a base class property selection exists for the identified one or more resource types;

responsive to the existence of the base class property selection, generate the table that comprises the group of resources and the base class property selection; and display the table to the user via the graphical user interface.

15. The apparatus of claim 14, wherein the instructions further cause the processor to:

responsive to the absence of the base class property selection, generate the table that comprises the group of resources and a default property selection; and display the table to the user via the graphical user interface.

16. The apparatus of claim 9, wherein the instructions further cause the processor to:

responsive to the group of resources being one of the plurality of previously saved groups of resources, determine whether the previously saved group of resources has an associated saved group of properties;

responsive to the previously saved group of resources having the associated saved group of properties, generate a table that comprises the previously saved group of resources and the associated saved group of properties; and display the table to the user via the graphical user interface.

17. A method, in a data processing system, for dynamically selecting which properties to display, the method comprising:
    receiving a selection of a group of resources to be viewed in a graphical user interface;
    determining whether the group of resources is one of a plurality of previously saved groups of resources;
    responsive to the group of resources failing to be one of the plurality of previously saved groups of resources, identifying one or more resource types within the group of resources;
    determining whether a user specified property selection exists for the identified one or more resource types;
    responsive to the absence of the user specified property selection, determining whether a group property selection exists for the identified one or more resource types:
    responsive to the absence of the group property selection, determining whether a specified resource type property selection exists for the identified one or more resource types;
    responsive to the existence of the specified resource type property selection, generating the table that comprises the group of resources and the specified resource type property selection; and
    displaying the table to a user via a graphical user interface.

18. The method of claim 17, further comprising:
    responsive to the previously saved group of resources failing to have the associated saved group of properties, identifying one or more resource types within the group of resources;
    determining whether a user specified property selection exists for the identified one or more resource types;
    responsive to the existence of the user specified property selection, generating the table that comprises the group of resources and the user specified property selection; and
    displaying the table to the user via the graphical user interface.

19. The method of claim 17, further comprising:
    responsive to the existence of the user specified property selection, generating the table that comprises the group of resources and the user specified property selection; and
    displaying the table to the user via the graphical user interface.

20. The method of claim 19, further comprising:
    responsive to the existence of the group property selection, generating the table that comprises the group of resources and the group property selection; and
    displaying the table to the user via the graphical user interface.

21. The method of claim 17, further comprising:
    responsive to the absence of the specified resource type property selection, determining whether the identified one or more resource types is homogeneous;
    responsive to the identified one or more resource types being homogeneous, determining whether a resource type property selection exists for the identified one or more resource types;
    responsive to the existence of the resource type property selection, generating the table that comprises the group of resources and the resource type property selection; and
    displaying the table to the user via the graphical user interface.

22. The method of claim 21, further comprising:
    responsive to the absence of the resource type property selection, determining whether the identified one or more resource types has a common base class;
    responsive to the identified one or more resource types having the common base class, determining whether a base class property selection exists for the identified one or more resource types;
    responsive to the existence of the base class property selection, generating the table that comprises the group of resources and the base class property selection; and
    displaying the table to the user via the graphical user interface.

23. The method of claim 22, further comprising:
    responsive to the absence of the base class property selection, generating the table that comprises the group of resources and a default property selection; and
    displaying the table to the user via the graphical user interface.

24. The method of claim 17, further comprising:
    responsive to the group of resources being one of the plurality of previously saved groups of resources, determining whether the previously saved group of resources has an associated saved group of properties;
    responsive to the previously saved group of resources having the associated saved group of properties, generating a table that comprises the previously saved group of resources and the associated saved group of properties; and
    displaying the table to the user via the graphical user interface.

* * * * *